Figure 1:
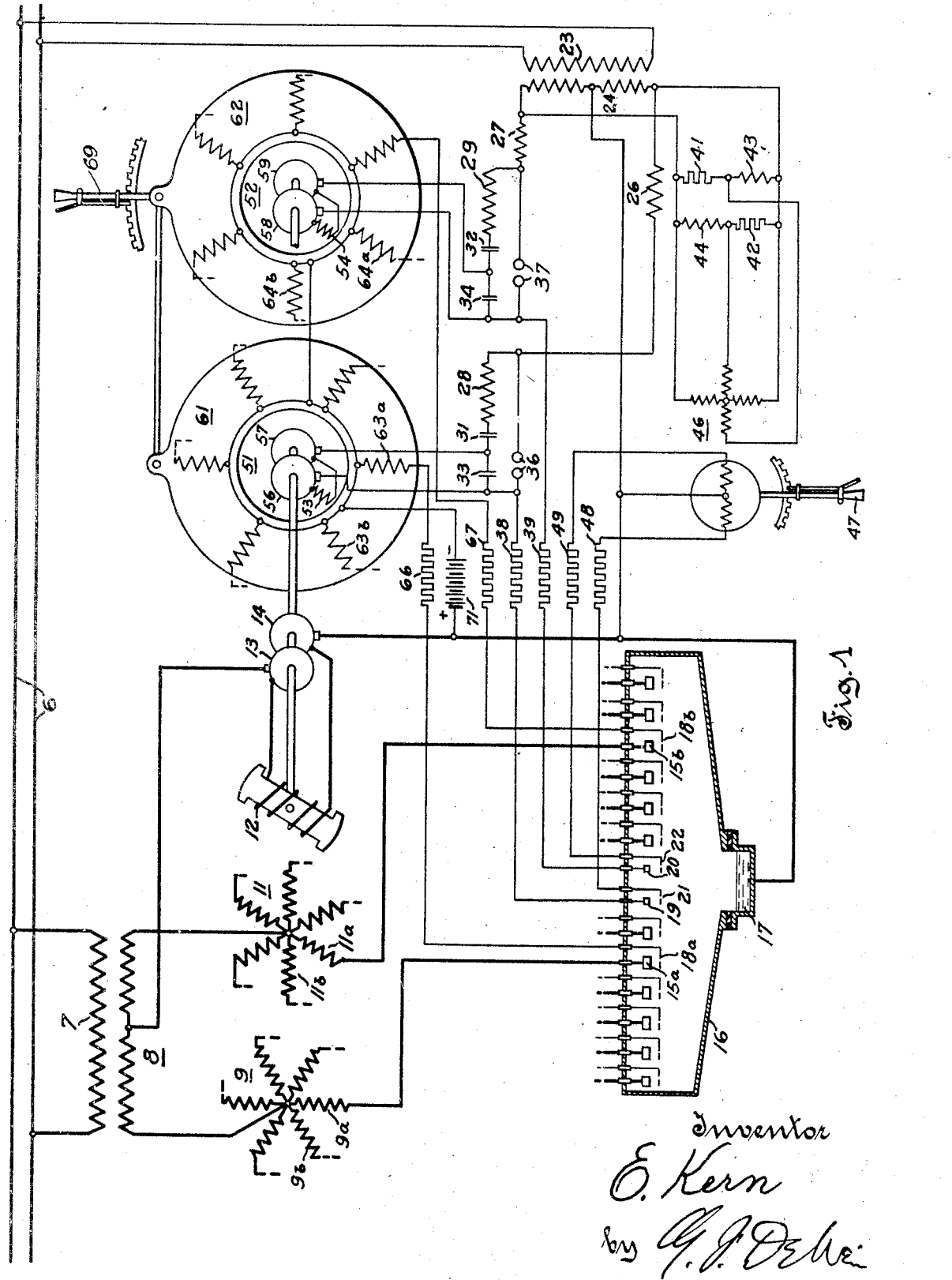

May 29, 1934.   E. KERN   1,960,818
MOTOR CONTROL SYSTEM
Filed Nov. 28, 1932   3 Sheets-Sheet 2

Inventor
E. Kern
by G. J. D'Wein
Attorney

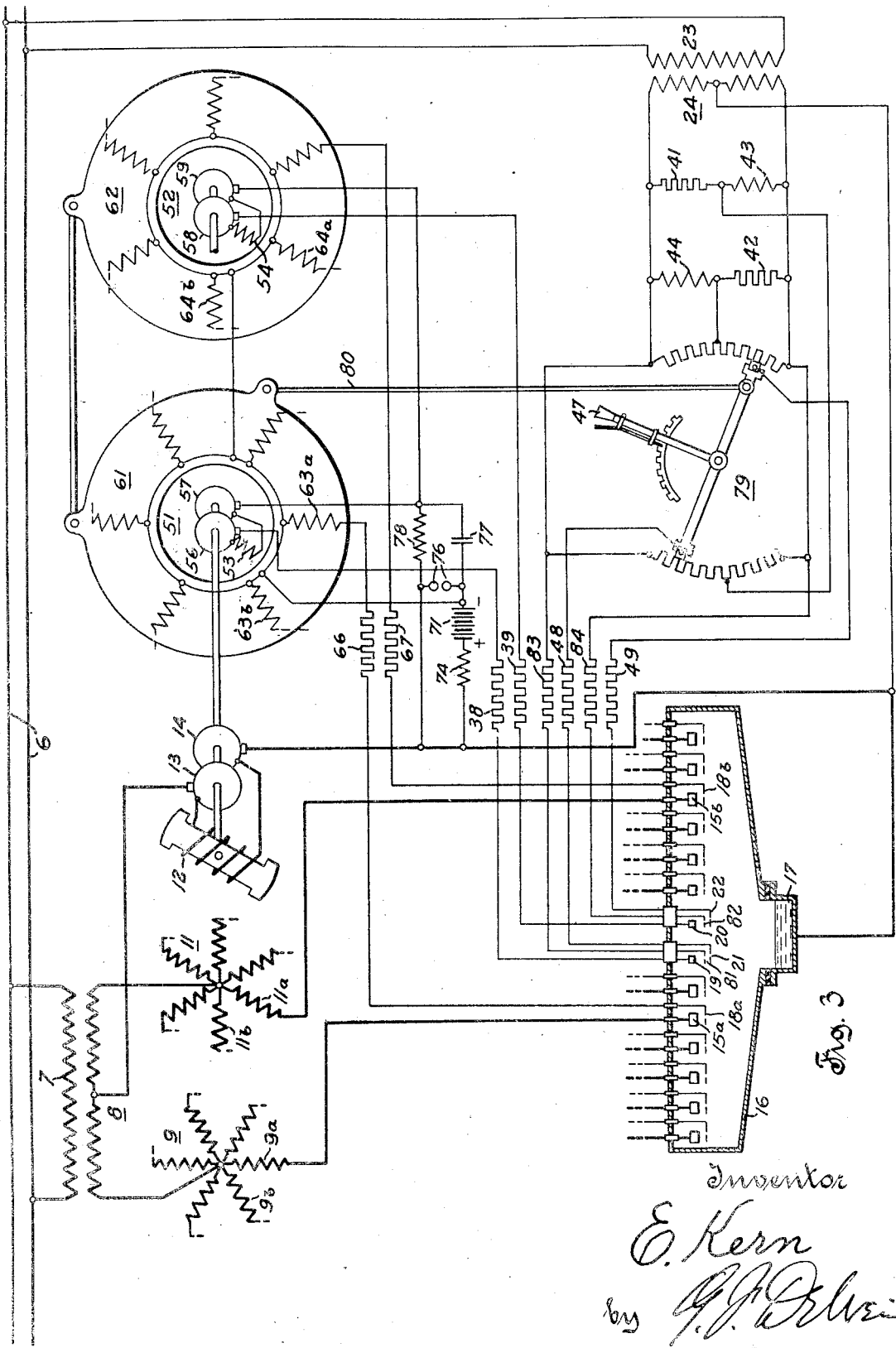

Patented May 29, 1934

1,960,818

UNITED STATES PATENT OFFICE 1,960,818

MOTOR CONTROL SYSTEM

Erwin Kern, Ennetbaden, Switzerland, assignor to Aktiengesellschaft Brown Boveri & Cie., Baden, Switzerland, a joint stock company of Switzerland Application November 28, 1932, Serial No. 644,597
In Germany December 9, 1931

10 Claims. (Cl. 172—179)

The invention relates to improvements in electric motor control systems and more particularly to the control of variable speed electric motors in which the armature currents are commutated by means of an electron discharge device.

It is well known to control the armature currents of electric motors of the so-called synchronous type through an electron discharge device provided with control electrodes to operate such motors at variable speeds. It is also known to utilize, as a source of control currents, a synchronous generator driven from the shaft of the motor itself, thereby avoiding the use of such distributors. The control currents supplied to the control electrodes of the electron discharge device are generally applied over a segmental distributor; such distributors, however, are subject to wear and require a certain amount of attendance. Such synchronous generators, however, depend upon the rotation of the motor for their operation and are therefore inoperative while the motor is at standstill. The use of the distributor and the attendant disadvantage are obviated while the system remains operative when the motor is at standstill, by energizing the control electrodes of the electron discharge device, through phase shifters of the rotary transformer type, driven from the shaft of the motor, from a source of alternating current at a frequency preferably high compared to the frequency of the line voltage.

It is, therefore, among the objects of the present invention to provide a control system for variable speed alternating current motors in which the motor armature currents are commutated by means of an electron discharge device or by means of a plurality of such devices.

Another object of the present invention is to provide a control system for variable speed alternating current motors, to which the current supply is commutated by an electron discharge device controlled without using a distributor of the segmental type.

Another object of the present invention is to provide a control system for variable speed alternating current motors having the current supply thereto commutated by an electron discharge device controlled by means of currents at a frequency higher than the frequency of the supply line voltage.

Another object of the present invention is to provide a control system for variable speed alternating current motors with an electron discharge device controlled by means of phase shifters of the rotary transformer type, driven from the motor shaft to commutate the current supplied to the motors.

Figure 4:
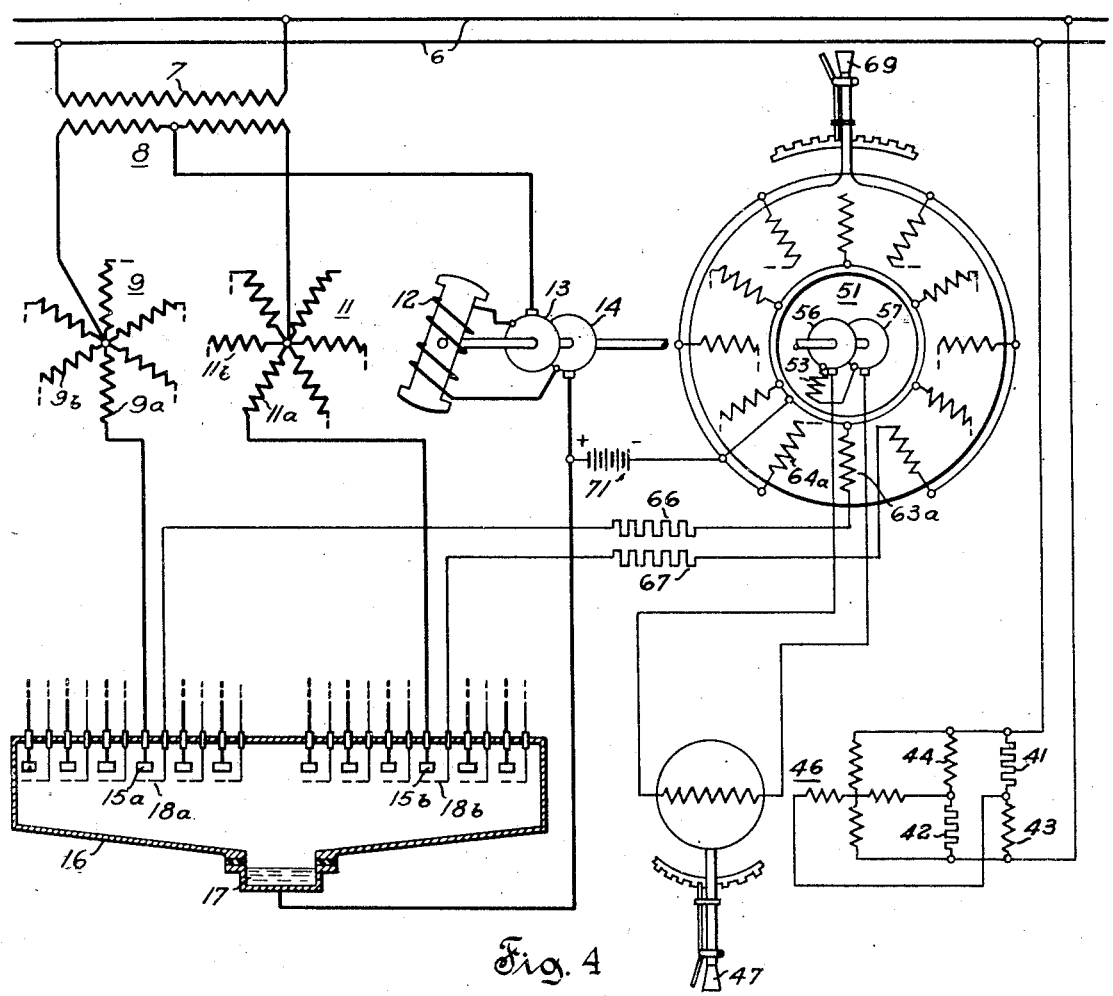
Figure 2:
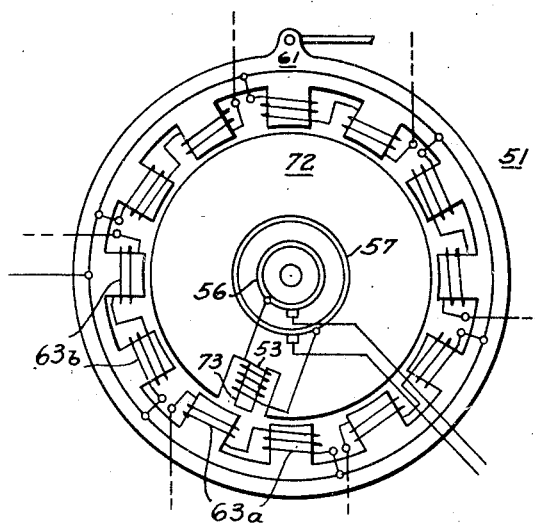

Objects and advantages other than those above set forth will be apparent from the following description when read in connection with the accompanying drawings, in which:

Fig. 1 diagrammatically illustrates one embodiment of the present invention consisting of a control system for a single phase variable speed motor in which the control electrodes of an electron discharge device which commutates the current supply to the motor, are energized at a frequency higher than the supply line frequency through two phase shifters;

Fig. 2 is an enlarged diagrammatic view of one of the phase shifters illustrated in Fig. 1;

Fig. 3 diagrammatically illustrates a modified embodiment of the present invention differing from that illustrated in Fig. 1 in that the high frequency control currents are produced from a direct current source and may be supplied to each control electrode during periods of variable length during each cycle of the supply line voltage; and Fig. 4 diagrammatically illustrates a further embodiment of the present invention in which the control electrodes of the electron discharge device may be energized with voltages at the frequency of the supply line voltage through a single phase shifter.

Referring more particularly to the drawings by characters of reference, the reference numeral 6 designates a single phase alternating current supply line from which the motor is to be energized. The motor is connected with line 6 by means of a transformer having a primary winding 7 and a secondary winding 8 provided with a mid tap. The terminals of secondary winding 8 are connected with the neutral points of the motor armature windings 9 and 11 which are each subdivided into a plurality of portions such as 9a, 9b, etc. connected in star. The motor field winding is designated by 12. It is assumed that the armature is stationary and that the field is rotating so that the field winding must be supplied through the usual slip rings 13 and 14. The several portions of armature windings 9 and 11 are distributed on the periphery of the armature, and the several portions of winding 9 are preferably spatially displaced with respect to the similar portions of winding 11 to produce the transfer of current from one portion to another of winding 9 and the transfer of current from one portion to another of winding 11 for different positions of the motor field, thereby producing a more uniform torque than would be obtained if the portions of windings 9 and 11 were coincident. The portions of windings 9 and 11 are severally connected with anodes 15a, 15b, etc. of an electron discharge device 16 operable as an electric current rectifier and provided with a cathode 17. Cathode 17 is connected with slip ring 14, and the mid tap of winding 8 is connected with slip ring 13, thereby providing for series connection of the motor elements to impart to the motor a series characteristic. Rectifier 16 is provided with a plurality of control electrodes 18a, 18b, etc. for controlling the flow of current therethrough, and is also provided with auxiliary anodes 19 and 20 and with control electrodes 21 and 22 associated therewith.

In the embodiment illustrated in Fig. 1, a portion of the control currents for controlling the operation of rectifier 16 are obtained from line 6 through a control transformer having a primary winding 23 and a secondary winding 24 provided with a mid-tap connected with cathode 17. One terminal of winding 24 supplies current to auxiliary anode 19 through a reactor 26, through an oscillating circuit comprising a reactor 28, condensers 31 and 33 and a spark gap 36, and through a resistance 38. The other terminal of winding 24 supplies current to auxiliary anode 20 over a similar circuit through reactor 27 and an oscillating circuit consisting of reactor 29, condensers 32 and 34 and spark gap 37, and a resistance 39. Control electrodes 21 and 22 associated with auxiliary anodes 19 and 20 are energized from winding 24 through a phase shifter 46 and resistances 48 and 49. To produce the usual rotating field within phase shifter 46, one of the stator windings thereof may be directly connected with winding 24 whereas the other stator winding is connected with winding 24 through a phase shifting circuit comprising resistances 41 and 42 and reactors 43 and 44 as is well known in the art. The phase relation between the output voltage of phase shifter 46 and the voltage of line 6 may be varied by adjustment of a lever 47 mounted on the shaft of such phase shifter.

The control currents to be supplied to the several control electrodes of rectifier 16 regulating the flow of current through the several portions of winding 9 are obtained from a phase shifter 51 which comprises a transformer having a rotatable primary winding 53 connected across condenser 33 through slip rings 56 and 57. Phase shifter 51 is provided with a stator 61 carrying in the slots thereof the several portions 63a, 63b, etc. of a secondary winding 63. All the portions of winding 63 are interconnected at a neutral point thereof connected with the negative terminal of battery 71 having the positive terminal thereof connected with cathode 17. The portions of winding 63 are severally connected with an equal number of control electrodes of the rectifier through resistances such as 66. The control electrodes controlling the operation of winding 11 are similarly energized from a second phase shifter 52 provided with a rotatable primary winding 54 connected across condenser 34 through slip rings 58 and 59. Phase shifter 52 is provided with a stator 62 carrying a winding 64 divided into a plurality of portions 64a, 64b, etc. Each portion of winding 62 is connected with the negative terminal of battery 71 and with one of the control electrodes of rectifier 16 through a resistance such as 67. The position of stators 61 and 62 may be adjusted by means of a lever 69.

As shown in Fig. 2 which illustrates one of the phase shifters such as 51 in greater detail, the rotatable primary winding 53 is inserted in a recess in rotor 72 mounted on the shaft of the motor 9, 11, 12. Such recess is provided with a pole piece 73 extending on only a very small arc of the circumference of the rotor so that, during operation of the motor, a rotation of a very small angle will cause the flux of pole piece 73 to entirely enter or leave only one of the portions of secondary winding 63 with the result that each such portion receives by transformer action either a maximum induced voltage from primary winding 53 or else no voltage at all. The flux leaving rotor 72 through pole piece 73 returns to the rotor over the balance of the periphery thereof so that the flow of such flux induces, in the portions of winding 63 adjacent such periphery, voltages which are small compared with the voltage induced in the portion of winding 63 then adjacent winding 53. By selecting the voltage of battery 71 at a larger value than the peak value of the voltages induced in the portions of winding 63 not then adjacent to winding 53, such voltages do not bring the control electrodes to which such non-adjacent windings are connected to a potential which is positive with respect to the potential of cathode 17 so that the voltages applied to such control electrodes do not disturb the operation of the motor. Such voltages may be entirely eliminated by dividing each portion of winding 63 into two halves assembled in the slots of stator 61 so as to prevent the form of a figure 8 as shown in Fig. 2. The voltages induced in the two halves of the winding portion, when winding 53 is not adjacent to such portion, then oppose each other and do not appear at the terminals thereof. During the rotation of pole piece 73 over such a winding portion, a reversal of the induced voltage thus occurs when the pole piece passes from one-half of the winding portion to the other half, but such reversal does not affect the operation of the motor.

In operation, assuming the system to be connected as shown in the drawings and the several elements of the system in the position indicated therein, line 6 being energized supplies current to winding 7 and consequently, winding 8 energizes windings 9 and 11. It is assumed that, at the instant considered, winding 9 receives a positive half wave potential with respect to cathode 17 from line 6 through winding 7 and one-half of winding 8. Auxiliary anode 19 is then arranged to be energized from line 6 at a positive potential with respect to cathode 17 through windings 23 and 24 of the control transformer, reactor 26, spark gap 36 and resistance 38. Phase shifter 46 is so adjusted that, previous to the instant considered, control electrode 21 is energized at a negative potential from phase shifter 46 through resistance 48 and that, at the instant considered, such control electrode becomes positively energized. Auxiliary anode 19 associated therewith is then capable of carrying current and, being positively energized with respect to cathode 17, from winding 24 over spark gap 36, causes the spark gap to break down. Current then flows from winding 24 over reactor 26, spark gap 36, resistance 38, auxiliary anode 19, cathode 17 to the mid tap of winding 24. The flow of such current produces high frequency oscillations within the circuit comprising spark gap 36, reactor 28, and condensers 31 and 33. The high frequency voltage thus appearing at the terminals of condenser 33 is applied to primary winding 53 of the phase shifter through slip rings 56 and 57. During such operation, all control electrodes 18 of rectifier 16 are maintained at a negative potential with respect to the potential of cathode 17 by means of battery 71, thereby preventing the operation of any of the anodes associated therewith. Upon breakdown of spark gap 36, the flow of high frequency current in primary winding 53 induces, by transformer action, in secondary winding portion 63a, voltages such that the peak value thereof is greater than the voltage of battery 71. Control electrode 18a is thus brought to a potential which is positive with respect to the potential of cathode 17 at intervals equal to one cycle of the voltage induced in winding 63a. Such energization of control electrode 18a then permits the associated anode 15a to carry current, and current flows from winding 8 over winding portion 9a, anode 15a, cathode 17, slip ring 14, field 12, slip ring 13, to the mid tap of winding 8. The flow of such current continues as long as anode 15a is at a positive potential with respect to cathode 17.

During the next half cycle of the voltage of line 6, winding 9 and auxiliary anode 19 are negatively energized with respect to cathode 17 and therefore no longer enter into the operation of the motor as is well known in the electric current rectifying art. Winding 11 and auxiliary anode 20 are then positively energized with respect to cathode 17, and a portion of winding 11 such as 11a then carries current by a process similar to that described above with respect to winding portion 9a. Such alternate flow of current in winding portions 9a and 11a is repeated during each cycle of the voltage of line 6 and results in the flow of a pulsating current in field 12, thereby producing a torque of uniform direction on the motor. Such alternate flow of current continues until such time that, due to the rotation of the motor shaft, winding 53 ceases to induce voltages in winding portion 63a and induces voltage in winding portion 63b, at which time the flow of current is directed alternately over winding portions 9b and 11b. Further rotation of the motor then causes primary winding 54 to cease inducing voltages in secondary winding portion 64a and to induce voltages in winding portion 64b. The alternate flow of current then occurs between winding portions 9b and 11b. The above cycle of sequential energization is repeated for each portion of windings 9 and 11 during each revolution of the motor, each portion receiving current from line 6 during a variable number of successive voltage cycles depending upon the speed of the motor.

It will be understood that the use of phase shifters 51 and 52 of the rotary transformer type permits energization of the control electrodes of rectifier 16 in a positive manner and is not subject to the uncertain operation of a distributor due to turning of the segments thereof or to accumulation of foreign material thereon. The torque of the motor may be varied by adjustment of lever 69 thereby controlling the sequential energization of each portion of windings 9 and 11 with respect to the position of the motor field. The current drawn by the motor may be directly adjusted by motion of lever 47 mounted on phase shifter 46, thereby adjusting the time at which the motor receives current from the line during each cycle of the line voltage. By reversing levers 47 and 69 by 180 electrical degrees, the motor may be made operable for regenerative braking provided that auxiliary anodes 19 and 20 are then energized from the connection points of resistance 42 with reactor 44 and of resistance 41 with reactor 43, thereby shifting the voltages applied to the auxiliary anodes by substantially 90 degrees lagging.

In the embodiment illustrated in Fig. 3 the high frequency control currents are no longer produced in a pair of oscillating circuits alternately energized from line 6, but are continuously produced in a single oscillating circuit comprising a spark gap 76, a condenser 77 and a reactor 78 energized from battery 71. The magnitude of the high frequency currents flowing over such circuit is controlled by means of a reactor 74. In the present embodiment, winding 53 is connected across reactor 78 over slip rings 56 and 57, resistance 38, auxiliary anode 19 and cathode 17. The voltage of reactor 78 is also applied on winding 54 over slip rings 58 and 59, resistance 39, auxiliary anode 20 and cathode 17. In the present embodiment phase shifter 46 energizing control electrodes 21 and 22 is shown as being replaced by a rheostat 79 operable for energizing such control electrodes at the same voltages as in the embodiment illustrated in Fig. 1. Rheostat 79 may be adjusted by means of lever 47 and is mechanically connected with stators 61 and 62 by means of a connecting rod 80. Such connection permits regulation of the flow of current in the motor and regulation of the torque thereof in any desired manner to impart to the motor any desired characteristic within the range of characteristics permitted by the particular connection of the armature and of the field. As in the embodiment of Fig. 1 the operation of auxiliary anodes 19 and 20 is controlled by means of control electrodes 21 and 22 and, in addition, such operation is further controlled by means of control electrodes 81 and 82 energized from winding 24 over resistances 83 and 84.

The operation of the present embodiment is similar to that of the embodiment illustrated in Fig. 1 and will be described only to the extent to which such operations differ. In the present embodiment, high frequency oscillations are continuously produced from battery 71 over spark gap 76, over condenser 77 and reactors 78 and 74. Again assuming that winding 9 is energized at a positive potential with respect to cathode 17 and that it is desired to permit flow of current through portion 9a thereof, such flow of current is initiated at the instant at which both control electrodes 21 and 81 have become positive with respect to cathode 17. Only when both such control electrodes are positive can auxiliary anode 19 carry current and a high frequency current then flows from reactor 78 over slip ring 57, winding 53, slip ring 55, resistance 38, anode 19, cathode 17 to reactor 78. Such flow of current in winding 53 induces, in winding portion 63a, another current flowing over resistance 66, control electrode 18a, cathode 17, reactor 74 and battery 71, back to winding 53. Control electrode 18a is thus energized at a positive potential with respect to cathode 17 at intervals equal to one cycle of the high frequency voltage, thereby permitting anode 15a to carry current. After an interval of one-half cycle of the voltage of line 6, winding 11 is positively energized and portion 11a thereof may carry current upon energization of control electrode 18b, such energization depending upon a simultaneous positive energization of control electrodes 22 and 82 in a manner similar to that described above with respect to winding 9.

In the embodiment illustrated in Fig. 4 phase shifter 52 is omitted and phase shifter 51 is then provided with a stator carrying the several portions of windings 63 and 64. Although such portions are represented by adjacent coils, the several portions overlap by one-half of their width to permit flow of current through one portion of winding 9 and one portion of winding 11 for any position of the motor field. In the present embodiment winding 53 is energized from line 6 through phase shifter 46 and therefore receives current at line frequency.

In operation, assuming that winding 9 is positively energized and that it is desired to permit flow of current through portion 9a thereof, phase shifter 46 is so adjusted that, at the instant considered, the voltage induced in winding portion 63a becomes greater than the voltage of battery 71, thereby energizing control electrode 18a at a positive potential with respect to cathode 17. After an interval of one-half cycle of the voltage of line 6, winding 11 is positively energized and control electrode 18b becomes positive with respect to cathode 17 when the voltage induced in winding portion 64a becomes greater than the voltage of battery 71. Such operation is repeated sequentially for each portion of the armature windings as in the embodiments previously described. In the present embodiment the armature currents and the motor torque may be controlled by means of lever 47 and the torque of the motor may be further controlled by means of lever 69 as shown in Fig. 1.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a motor control system, an alternating current supply line, a motor having a plurality of armature windings and a field excitation winding, the armature windings being connected with said line, an electron discharge device having anodes with associated control electrodes and a cathode, the armature windings of said motor being connected with and energized by operation of the anodes of said device, a source of direct current potential negative relative to the potential of the cathode and connected with the control electrodes to prevent operation of the anodes of said device, and rotatable transformer phase shifting means connected with said line and operated by said motor to apply, by transformer action, an alternating current voltage greater than the voltage of said source to the control electrodes to control operation of said device.

2. In a motor control system, an alternating current supply line, a motor having a plurality of armature windings and a field excitation winding, the armature windings being connected with said line, an electron discharge device having anodes with associated control electrodes and a cathode, the armature windings of said motor being connected with and energized by operation of the anodes of said device, a source of direct current potential negative relative to the potential of the cathode and connected with the control electrodes to prevent operation of the anodes of said device, a transformer connected with said line and having the mid point of the secondary winding thereof connected with the cathode of said device, and rotatable transformer phase shifting means connected with the terminals of the secondary winding of said transformer and operated by said motor to apply, by transformer action, an alternating current voltage greater than the voltage of said source to the control electrodes to control operation of said device.

3. In a motor control system, an alternating current supply line, a motor having a plurality of stator windings and a rotor winding, the stator windings being connected with said line, an electron discharge device having anodes with associated control electrodes and a cathode, the stator windings of said motor being connected with and energized by operation of the anodes of said device, a source of direct current potential negative relative to the potential of the cathode and connected with the control electrodes to prevent operation of the anodes of said device, an adjustable phase shifter, an adjustable phase shifter rotated by said motor and controlled by the first said phase shifter, and a transformer connected with said line and having the mid point of the secondary winding thereof connected with the cathode of said device and having the terminals of the secondary winding connected with said phase shifters to permit the application of an alternating current voltage greater than the voltage of said source to the control electrodes to control operation of said device.

4. In a motor control system, an alternating current supply line, a motor having a plurality of stator windings and a rotor winding, the stator windings being connected with said line, an electron discharge device having anodes with associated control electrodes and a cathode, said device having a plurality of auxiliary anodes with associated control electrodes, the stator windings of said motor being connected with and energized by operation of the anodes of said device, a source of direct current potential negative relative to the potential of the cathode and connected with the control electrodes to prevent operation of the anodes of said device, phase shifting means connected with said line and operated by said motor to apply an alternating current voltage greater than the voltage of said source to the control electrodes of said device to control operation of said device, and an oscillating circuit connecting said phase shifting means with said line to control operation of the auxiliary anodes of said device.

5. In a motor control system, an alternating current supply line, a motor having a plurality of stator windings and a rotor winding, the stator windings being connected with said line, an electron discharge device having anodes with associated control electrodes and a cathode, the stator windings of said motor being connected with and energized by operation of the anodes of said device, a source of direct current potential negative relative to the potential of the cathode and connected with the control electrodes to prevent operation of the anodes of said device, an adjustable phase shifter, an adjustable phase shifter rotated by said motor and controlled by the first said phase shifter, a transformer connected with said line and having the mid point of the secondary winding thereof connected with the cathode of said device, the terminals of the secondary winding of said transformer being connected with the first said phase shifter, and an oscillating circuit connecting said phase shifting means with the terminals of the secondary winding of said transformer to obtain application of an alternating current voltage greater than the voltage of said source and at a frequency greater than the frequency of said line to the control electrodes to control the operation of the anodes of said device.

6. In a motor control system, an alternating current supply line, a motor having a plurality of stator windings and a rotor winding, the stator windings being connected with said line, an electron discharge device having anodes with associated control electrodes and a cathode, the stator windings of said motor being connected with and energized by operation of the anodes of said device, a source of direct current potential negative relative to the potential of the cathode and connected with the control electrodes to prevent operation of the anodes of said device, an adjusable phase shifter, an adjustable phase shifter rotated by said motor and controlled by the first said phase shifter, a transformer connected with said line and having the mid point of the secondary winding thereof connected with the cathode of said device, the terminals of the secondary winding of said transformer being connected with the first said phase shifter, and an oscillating circuit connected with said phase shifting means to obtain application of an alternating current voltage greater than the voltage of said source and at a frequency greater than the frequency of said line to the control electrodes to control the operation of the anodes of said device.

7. In a motor control system, an alternating current supply line, an electric motor comprising an armature winding divided into a plurality of angularly displaced sections connected to form a neutral point, electron discharge means comprising a plurality of anodes severally connected with the sections of said winding and a plurality of control electrodes severally associated with said anodes, a transformer connecting said line with the neutral point of said winding, and phase shifting means comprising a static secondary winding divided into a plurality of angularly displaced sections severally connected with said control electrodes and a rotatable primary winding intermittently energized from said line operable to induce, by transformer action, voltages sequentially in the sections of said secondary winding of such sign and magnitude and during such recurring periods as to control thereby the moments of initiation of flow of current sequentially through the sections of said armature winding by way of said anodes.

8. In a motor control system, an alternating current supply line, an electric motor comprising a plurality of armature windings each divided into a plurality of angularly displaced sections connected to form a neutral point, electron discharge means comprising a plurality of anodes severally connected with the sections of said winding and a plurality of control electrodes severally associated with said anodes, a transformer connecting said line with the neutral points of said windings, and phase shifting means comprising a static secondary winding divided into a plurality of angularly displaced sections severally connected with said control electrodes and a rotatable primary winding intermittently energized from said line operable to induce, by transformer action, voltages sequentially in the sections of said secondary winding of such sign and magnitude and during such recurring periods as to control thereby the initiation of flow of current from said line sequentially through the sections of said armature windings by way of said anodes.

9. In a motor control system, an alternating current supply line, an electric motor comprising an armature winding divided into a plurality of angularly displaced sections connected to form a neutral point, electron discharge means comprising a plurality of anodes severally connected with the sections of said winding and a plurality of control electrodes severally associated with said anodes, a transformer connecting said line with the neutral point of said winding, phase shifting means comprising a static secondary winding divided into a plurality of sections severally connected with said control electrodes and a rotatable primary winding, and means connected with said line and said primary winding operable to intermittently produce in the latter currents of high frequency relative to the voltage frequency of said line whereby voltages are induced, by transformer action, sequentially in the sections of said secondary winding of such sign and magnitude and during such recurring periods as to control thereby the moments of initiation of flow of current sequentially through the sections of said armature winding by way of said anodes.

10. In a motor control system, an alternating current supply line, an electric motor comprising an armature winding divided into a plurality of angularly displaced sections connected to form a neutral point, electron discharge means comprising a plurality of anodes severally connected with the sections of said winding and a plurality of control electrodes severally associated with said anodes, a transformer connecting said line with the neutral point of said winding, phase shifting means comprising a static secondary winding divided into a plurality of angularly displaced sections severally connected with said control electrodes and a rotatable primary winding intermittently energized from said line operable to induce, by transformer action, voltages sequentially in the sections of said secondary winding of such sign and magnitude and during such recurring periods as to control thereby the moments of initiation of flow of current sequentially through the sections of said armature winding by way of said anodes, and means comprising a phase shifter energized from said line for varying the moments of energization of said primary winding relative to the voltage frequency of said line.

ERWIN KERN.